E. TAYLOR.
AUTOMATIC SUBSTATION.
APPLICATION FILED JULY 7, 1915.
1,281,875.
Patented Oct. 15, 1918.
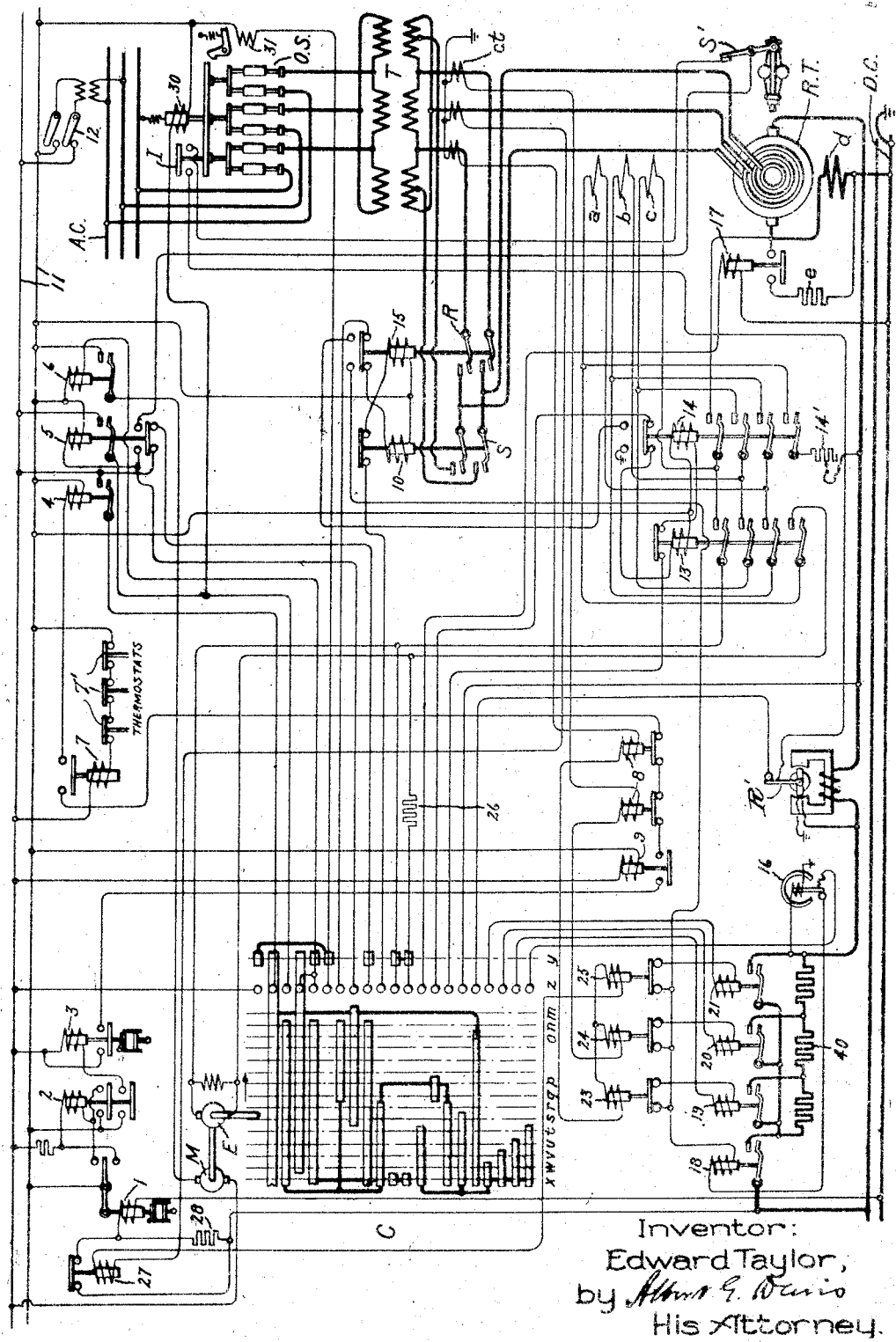
Inventor:
Edward Taylor,
by Albert G. Davis
His Attorney.

UNITED STATES PATENT OFFICE.

EDWARD TAYLOR, OF CHICAGO, ILLINOIS, ASSIGNOR TO GENERAL ELECTRIC COMPANY, A CORPORATION OF NEW YORK.

AUTOMATIC SUBSTATION.

1,281,875. Specification of Letters Patent. Patented Oct. 15, 1918.

Application filed July 7, 1915. Serial No. 38,621.

*To all whom it may concern:*

Be it known that I, EDWARD TAYLOR, a citizen of the United States, residing at Chicago, county of Cook, State of Illinois, have invented certain new and useful Improvements in Automatic Substations, of which the following is a specification.

My invention relates to an automatic substation of the type comprising a rotary transformer interposed between a supply circuit and a distribution circuit.

An automatic substation of this type has been devised for use in connection with an electric railway system in which the electromagnetic switches, utilized for starting the rotary transformer and connecting it to the desired circuits, have been energized from the distribution circuit, and in which a motor-driven drum controller is used for determining the sequence of operation of the electromagnetic switches. Such a station is described in my copending application, Serial No. 38,620, filed July 7, 1915. When used with an electric railway system, however, such an automatic substation is subject to the limitation that, in order to properly operate the motor for driving the drum controller, and to operate the electromagnetic switches, a source of direct current of suitable voltage must be available. Where this source of current is taken from the railway trolley, the voltage is not always suitable, as at times it falls below 200 volts, and, consequently, the operation of the motor and various relays is not positive. Since this occurs at just the time when it is desired to utilize the substation, it will be seen that this limitation is a serious disadvantage.

In the substation described in my copending application this same source of direct current is utilized to energize the shunt field of the rotary transformer in order to fix its polarity in the right direction. As a result, low voltage or no voltage on the trolley line prevents the automatic substation from being properly put into service.

The object of my invention, therefore, is to provide an automatic substation involving an arrangement of apparatus which shall overcome these disadvantages.

The construction and arrangement of my substation will be more readily understood from the following specification when taken in connection with the accompanying drawing, in which the single figure is a diagrammatic view illustrating the arrangement and connections of the apparatus used.

The supply circuit A. C. is adapted to be connected to the rotary transformer R. T. which as shown is a rotary converter, by means of an oil switch O. S. through a transformer T and one or the other of the switches S and R. The rotary converter is supplied with the shunt field windings $a$, $b$, and $c$, and the series field winding $d$, the series field winding being permanently connected to the negative side of the distribution circuit D. C., and to one of the direct current terminals of the rotary converter. The other direct current terminal is arranged to be connected to the positive side of the distribution circuit through resistances 40. Various electromagnetic switches are utilized for effecting the proper connections, and some form of an automatically-operated controller, comprising fixed and movable contacts, is used to control the sequence of operation of these switches. For the sake of illustration, I have herein shown a motor-operated cylindrical drum controller or selector C, provided with fixed terminals and with properly arranged moving contact bars on the surface of the cylindrical drum, which are adapted to interconnect the fixed terminals of the controller at the desired time. The controller C is arranged to be driven by an alternating current motor M, and on the same shaft with this motor is an exciter E.

It is believed that the coöperation of the various switches employed will be more readily understood by considering them as they come into use during the starting operation of the substation. As one form of automatic control, I have herein illustrated a contact-making voltmeter 1, responsive to the voltage of the distribution circuit, which is arranged to bring a movable arm into contact with one or the other of two fixed contact points. At low voltages of the distribution circuit this movable arm will touch the upper contact point and energize the relay 2 from the control circuit 11. This control 11 is arranged to be energized from the supply circuit A. C., through a suitable transformer, when the switch 12 is closed. When the relay 2 picks up, its upper contacts close a holding circuit, which will retain it in this position, and its lower contacts energize a relay 3, which, in turn, will energize a master relay 4, provided that the contacts of the relays 7, 8 and 9 are closed. The relay 7 is arranged to be normally closed, and is controlled by a series of thermostats 7', which open the relay circuit in case of an excessive temperature on any part of the rotary converter to which said thermostats may be applied. The relays 8 are responsive to an excessive amount of power, transferred through the rotary converter, and when this amount is not exceeded their contacts are normally closed. The relay 9 is normally closed when a proper voltage for carrying on the desired operation of starting the substation is supplied to the control circuit 11. The closing of the master relay 4 will, through the controller C, close the circuit of the relay 6. When this relay picks up, it will supply power to the motor M and rotate the drum of the controller in the direction of the arrow. As soon as the controller reaches the position indicated by the dot-and-dash line $m$, power will be supplied, through the contacts of the master relay 4 and the controller, to the relay 5, thereby closing the same. The closing of this relay energizes the closing coil 30 of the oil switch, and supplies energy from the control circuit to a fixed contact point of the controller, so that when the controller moves to the position $n$, the coil 10 of the starting switch $s$ will be energized, thereby closing the same and supplying alternating current energy at a reduced voltage to the alternating current terminals of the rotary transformer. At this time, two other bars of the controller are brought into such a position that when at some later time, the relays 5 and 6 are both open, they will reënergize the relay 6 to move the controller back to its neutral position $z$. At the step $o$, a circuit is provided through a bar of the controller by means of which the relay 5 is held closed, and hence the closing coil 30 of the oil switch energized as long as the station is in operation, provided that the contacts of the switches R', S', and I are closed. The switch R' is a reverse current relay, so arranged that its contacts will open when current flows in the wrong direction. S' is a speed-responsive switch which will open when the speed is excessive. I is an interlock mechanically connected to the oil switch O. S. and so arranged that it is closed when the oil switch is closed. The drum controller now moves on for a certain interval without changing the connections and thus allows the rotary converter to accelerate until synchronous speed is reached. At this time, the drum controller has reached the position $p$ whereupon a switch 13 is energized and when it has closed connects the shunt field windings $a$, $b$ and $c$ in series with one another across the brushes of the exciter E. This exciter is so designed as to deliver approximately one-half of the voltage of the distribution circuit to said shunt field windings and make sure that the rotary transformer shall come up with the proper polarity. At the step $q$ no change is made, but between the steps $q$ and $r$ the circuit leading to the coil 10 of the starting switch S is broken and when the controller reaches position $r$, the coil 13 is deënergized and the coil 14 energized. The coils 13 and 14 are electrically interlocked. This latter closes a switch which connects the shunt field windings and the D. C. terminals of the rotary converter through the usual field rheostat 14'. At the same time, the coil 15 of the running switch R is energized thereby closing this switch and supplying the voltage of the supply circuit A. C. to the A. C. terminals of the rotary converter. The coils 10 and 15 are electrically interlocked. Movement of the controller to the position $s$ simply connects one of the movable bars of the controller to the positive D. C. terminal of the rotary converter, but at the next step a relay 18 is picked up thereby connecting the rotary converter to the distribution circuit through the resistances 40. A polarized relay 16 controls the circuit of the relay 18. At the same time a switch 17 is energized putting a resistance $e$ in shunt to the series field winding $d$. At the next three steps $u$, $v$, and $w$ of the controller, the relays 19, 20 and 21 are successively closed to thereby short-circuit sections of the resistance 40. Between the steps $w$ and $x$, the relay 6 is deënergized, thus opening the circuit leading to the motor M and when the operating position $x$ is reached the resistance 26 is thrown across the brushes of the exciter E thereby furnishing a dynamic brake for the motor and the controller C. This position $x$ is the running position of the controller and so long as the station stays in operation the controller is held in this position.

As a further automatic feature of my substation, I have provided a relay 27 responsive to the power transferred thereby. This relay is held in open position so long as the power transferred by the sub-station exceeds a predetermined amount and when open it throws a resistance 28 in series with contact making voltmeter 1 thereby giving the effect of low voltage on the same. If such an arrangement were not provided, the contact making voltmeter would move its movable arm to touch the lower contact as soon as normal voltage was obtained on the distribution circuit. This movement of the movable arm would short-circuit the relay 2 and deënergize the relays 3 and 4 and shut down the substation. When the load conditions of the distribution are such that the substation is no longer needed, the contacts of the relay 27 will close and switches 2, 3 and 4, etc., will be opened, thereby stopping the apparatus. Incidental to this the switch 5 will open and through this lower interlock contacts will reënergize the coil 6 thereby again supplying power to the motor M to rotate the drum controller to the position $y$ and the neutral position $z$. When the position $y$ is reached, the trip coil 31 of the oil switch S will be energized and the oil switch allowed to open. It will be seen that the dynamic braking circuit is maintained at this position $y$ thereby preventing overrunning of the controller C. As the controller leaves the position $y$ the motor circuit will be again interrupted and the controller will stop on the neutral position $z$. As a means of protection against overload without necessitating the complete shutdown of the sub-station, I have herein illustrated relays 23, 24 and 25 which are so energized from the current transformer $ct$ that they are responsive to the power transferred by the rotary converter. These relays 23, 24 and 25 are adjusted to open at different and successive values of the power transferred and when held open they thereby deënergize successively the relays 19, 20 and 21 and insert the sections of the resistance 40 between the rotary converter and the distribution circuit.

While I have herein illustrated the preferred embodiment of my invention, it will be readily seen that various modifications may be made and I, accordingly, seek to cover in the appended claims all modifications and variations which come within the true scope of my invention.

What I claim as new and desire to secure by Letters Patent of the United States is:

1. In combination, a supply circuit, a distribution circuit, a rotary transformer, electro-magnetic means adapted to be energized independently of said distribution circuit for connecting the transformer to the supply and distribution circuits, and automatic means responsive both to the distribution circuit voltage and the load on the transformer for controlling said electromagnetic means.

2. In combination, a supply circuit, a distribution circuit, a rotary transformer, electromagnetic means energized independently of said distribution circuit for connecting the transformer to the supply and distribution circuits, and automatic means operable upon a decrease in the voltage on said distribution circuit to a predetermined value to start the operation of said electromagnetic means to connect the transformer to said circuits and operable upon a decrease in the current delivered by said transformer to said distribution circuit to a predetermined value to cause said electromagnetic means to disconnect the transformer from said circuits.

3. The combination with a supply circuit and a distribution circuit, of a rotary transformer adapted to be connected therebetween, automatic means comprising electromagnetic devices adapted to be energized independently of the distribution circuit for connecting the transformer to both the supply circuit and the distribution circuit, and contact making means controlled by an electrical condition of the distribution circuit and by the power transferred by the transformer for controlling said automatic means.

4. The combination with a supply circuit and a distribution circuit, of a rotary transformer adapted to be connected therebetween, automatic means comprising electromagnetic means adapted to be operated by energy from the supply circuit for connecting the transformer to the supply circuit and electromagnetic means adapted to be operated by energy supplied by the transformer to connect the same to the distribution circuit to supply energy thereto, and contact making means controlled by an electrical condition of the distribution circuit and by the power transferred by the transformer for controlling said automatic means.

5. The combination with a supply circuit and a distribution circuit, of a rotary transformer provided with an exciting winding adapted to be connected therebetween, an exciter adapted to be connected to said winding, automatic means comprising electromagnetic switches adapted to be energized from the supply circuit for connecting the supply circuit to the transformer to start and operate the latter and for connecting said exciting winding to be energized first by the exciter and then by the transformer, electromagnetic switches adapted to be operated by energy supplied by the transformer to connect the same to the distribution circuit to supply energy thereto, and a motor operated selector for said switches, and means controlled both by an electrical condition of the distribution circuit and by the power transferred by the transformer for controlling said automatic means.

6. In combination, a supply circuit, a distribution circuit, a rotary transformer, automatic means for starting said transformer and connecting the same to said circuits including a controller, and means energized by said controller for disconnecting the transformer from said supply circuit before said controller has returned to its initial position.

7. In combination, a rotary transformer provided with an exciting winding, means for starting said rotary transformer including a controller, a generator, said controller being arranged to connect said generator to said exciting winding while said machine is being started and to then connect said exciting winding so that the rotary transformer shall be self excited.

8. In combination, a dynamo-electric machine, an exciting winding therefor, automatic means for starting and controlling said machine, including a movable controlling member, means for driving said member, an exciter also driven thereby, said controller being arranged to connect said exciter to said exciting winding during the starting period.

9. In combination, a supply circuit, a distribution circuit, a rotary transformer, and automatic means for starting said transformer and connecting it to said circuits including a motor operated controller, an exciter driven by said motor, said controller being arranged to first connect the exciting winding of said transformer to said exciter and to then connect it to the direct current terminals of said transformer.

10. In combination, a dynamo-electric machine, an exciting winding therefor, automatic means for starting and controlling said machine, including a movable controlling member, means for driving said member, an exciter also driven thereby, said controller being arranged to connect said exciter to said exciting winding during the starting period, said controller being also arranged to short circuit said exciter to brake the controller when the cycle of operations has been completed.

11. In combination, a dynamo-electric machine, automatic means for starting said machine including a motor operated controller, and a dynamic brake for said controller rendered effective only after the starting operation has been completed.

12. In combination, a dynamo-electric machine, automatic means for starting said machine including a controller, a motor for operating said controller, an auxiliary dynamo electric machine driven by said motor, said controller being arranged to short circuit said auxiliary machine during a portion of the movement of the controller.

13. In combination, a supply circuit, a distribution circuit, a rotary transformer, electromagnetic means for effecting connection of the transformer to said supply circuit, a selector for controlling the operation of said electromagnetic means, and means responsive to the temperature of said transformer for controlling the energization of said electromagnetic means.

14. In combination, a supply circuit, a distribution circuit, a rotary transformer, automatic means, comprising a motor and a controller operated thereby, for effecting the connection and disconnection of said transformer and said circuits, and speed responsive means for controlling the operation of said motor.

15. In combination, a supply circuit, a distribution circuit, a rotary transformer, automatic means, comprising a motor and a controller operated thereby, for effecting the connection and disconnection of said transformer and said circuits, and means responsive to the temperature of the transformer for controlling the operation of said motor.

16. In combination, a supply circuit, a distribution circuit, a rotary transformer, automatic means, comprising a motor and a controller operated thereby, for effecting the connection and disconnection of said transformer and said circuits, and means responsive to the direction of current flow between the said transformer and one of said circuits for controlling the operation of said motor.

17. In combination, a supply circuit, a distribution circuit, a rotary transformer, automatic means, comprising a motor and a controller operated thereby, for effecting the connection and disconnection of said transformer and said circuits, and means jointly controlled by the speed and temperature of said transformer and by the direction of current flow between said transformer and the distribution circuit for controlling the operation of said motor.

In witness whereof, I have hereunto set my hand this second day of July, 1915.

EDWARD TAYLOR.